(12) United States Patent
Kallstrom et al.

(10) Patent No.: US 10,051,171 B2
(45) Date of Patent: Aug. 14, 2018

(54) METHOD OF OPERATING A WEARABLE LIFELOGGING DEVICE

(71) Applicant: NARRATIVE AB, Linkoping (SE)

(72) Inventors: Martin Kallstrom, Linkoping (SE);
Eric Hampusgard, Linkoping (SE);
Linus Pizunski, Lund (SE); Simon Pantzare, Linkoping (SE); Bjorn Wesen, Lund (SE)

(73) Assignee: Third Dot AB, Lund (SE)

( * ) Notice: Subject to any disclaimer, the term of this patent is extended or adjusted under 35 U.S.C. 154(b) by 0 days.

(21) Appl. No.: 15/790,557

(22) Filed: Oct. 23, 2017

(65) Prior Publication Data

US 2018/0048802 A1    Feb. 15, 2018

Related U.S. Application Data

(63) Continuation of application No. 15/029,448, filed as application No. PCT/EP2014/072024 on Oct. 14, 2014, now Pat. No. 9,800,782.

(30) Foreign Application Priority Data

Oct. 14, 2013 (SE) ....................... 1351216

(51) Int. Cl.
*H04N 5/232* (2006.01)
*H04N 7/18* (2006.01)
*H04N 21/4223* (2011.01)

(52) U.S. Cl.
CPC ..... *H04N 5/23203* (2013.01); *H04N 5/23206* (2013.01); *H04N 5/23216* (2013.01);
(Continued)

(58) Field of Classification Search
CPC ........... H04N 5/23203; H04N 5/23206; H04N 5/23215; H04N 5/23222; H04N 5/23241;
(Continued)

(56) References Cited

U.S. PATENT DOCUMENTS

2006/0137198 A1  6/2006  Cato
2009/0110386 A1  4/2009  Kamada
(Continued)

FOREIGN PATENT DOCUMENTS

EP    1 898 634 A1    3/2008

OTHER PUBLICATIONS

PCT International Search Report for PCT International Application No. PCT/EP2014/072024.
(Continued)

*Primary Examiner* — Twyler Haskins
*Assistant Examiner* — Carramah J Quiett
(74) *Attorney, Agent, or Firm* — Knobbe, Martens, Olson & Bear, LLP

(57) ABSTRACT

The present disclosure provides a method of operating a wearable life logging device (2) comprising a data processing unit (9), a camera unit (7), and at least one motion sensor (4, 5). The method comprises selectively operating the device in a take photo state (200), wherein a photo is captured by means of the camera unit (7), and selectively operating the device in a sleep state (300), wherein the camera unit (7) is in a low power mode. The method further comprises causing the device to transition (120, 330, 430) to the take photo state (200) in response to a signal from the motion sensor (4, 5).

20 Claims, 3 Drawing Sheets

(52) U.S. Cl.
CPC ..... *H04N 5/23222* (2013.01); *H04N 5/23241* (2013.01); *H04N 5/23245* (2013.01); *H04N 5/23258* (2013.01); *H04N 7/188* (2013.01); *H04N 21/4223* (2013.01)

(58) Field of Classification Search
CPC ........... H04N 5/23245; H04N 5/23258; H04N 7/188; H04N 21/4223
See application file for complete search history.

(56) References Cited

U.S. PATENT DOCUMENTS

| | | |
|---|---|---|
| 2010/0118154 A1 | 5/2010 | Lee |
| 2010/0171846 A1* | 7/2010 | Wood ................. H04N 1/00323 348/231.99 |
| 2010/0315535 A1 | 12/2010 | Nurit |
| 2012/0200762 A1 | 8/2012 | Nakano |
| 2014/0308031 A1* | 10/2014 | Han .................... G03B 17/561 396/424 |
| 2016/0269613 A1 | 9/2016 | Kallstrom et al. |

OTHER PUBLICATIONS

PCT Written Opinion of the International Searching Authority for PCT International Application No. PCT/EP2014/072024.

* cited by examiner

METHOD OF OPERATING A WEARABLE LIFELOGGING DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present disclosure relates to a method for lifelogging and to a system which implements such a method.

Description of the Related Art

Lifelogging is the process of digitally lifelogging life experiences. A lifelogging system usually comprises a wearable lifelogging device which automatically and continuously captures the user's activities in the form of text and/or sensor data, such as image, audio or video lifeloggings which are stored and organized for future use.

People may want to log their activities for their own enjoyment, for example for keeping a diary or being able to retrieve and share personal experiences, including unanticipated ones, with others. Lifelogging may also be used for medical purposes, for example as an aid for people suffering from memory impairment.

Another application for lifelogging devices is one of personal security; a lifelogging device may be used to provide evidence in the event the user is harassed or attacked.

Yet another application is one of quality assurance; a lifelogging device may be used to document the user's activity. For example a police officer, nurse, physician, fireman, corrections officer, keeper or caretaker may use a lifelogging device to provide documentation of work performed and/or as evidence against accusations of malpractice or abuse.

For a lifelog not to be inconvenient and cumbersome to produce, it is important that the lifelogging system be user friendly and interfere as little as possible with the user's daily routine. It is desirable to improve existing lifelogging systems in these respects.

On the other hand, there remains a need to interact with the lifelogging system, e.g. in order to prevent it from taking photos in situations when this would be inappropriate or forbidden.

There is also a need to manage battery capacity of the lifelogging device such that it will have the capability of taking photos for a sufficient period of time before it needs charging.

SUMMARY OF THE INVENTION

It is an objective to improve the user experience of lifelogging systems. A particular object is to provide a lifelogging system which is easy, efficient and satisfying to use.

The invention is defined by the independent claims. Embodiments are set forth in the dependent claims and in the descriptions and drawings.

According to a first aspect, there is provided a method of operating a wearable life logging device comprising a data processing unit, a camera unit and at least one motion sensor. The method comprises selectively operating the device in a take photo state, wherein a photo is captured by means of the camera unit, and selectively operating the device in a sleep state, wherein the camera unit is in a low power mode. The method further comprises causing the device to transition to the take photo state in response to a signal from the motion sensor.

A lifelogging device is defined as a device which is configured for continuous or intermittent capture of images of the user and/or the user's experiences. Images thus captured may be associated with data indicating time/date and/or geographic position information for the respective image. The lifelogging device may be configured with an integrated intermediate image and data storage device. In the alternative, the lifelogging device may be configured for online transmission of image and data to a network-accessible storage device.

The operating of the device in the take photo state may further comprise reading at least the motion sensor and optionally causing the device to transition from the low power mode.

The method may further comprise causing the device to transition from the take photo state to the sleep state if the signal from the motion sensor is below a first threshold level or if a signal from the camera unit represents a light level lower than a predetermined second threshold value.

The first threshold level may be set so as to indicate whether the device is stationary on a substantially flat surface or whether it is in motion.

In one embodiment, the device may be caused to transition from the take photo state to the sleep state if the signal from the motion sensor has been below the first threshold value for a sufficient period of time or if the signal from the camera unit represents a light level lower than the first threshold value for a sufficient period of time.

The periods of time may be same or different.

The method may further comprise determining a gravity vector and causing the device to transition to the sleep state only if the gravity vector is within a predetermined range.

In this context, the term "range" is to be understood as a range of directions.

Hence, it is possible to determine the orientation of the device, and to condition the transition to the sleep state on the device having a specific orientation, such as horizontal.

The term "horizontal" should be construed as horizontal +/−10°, +/−5° or +/−1°.

In this manner, a user of the device is able to make the device transition to the sleep state by placing the device in a specific orientation, such as horizontal on a surface. Thereby, the device is, in a user friendly manner, prevented from taking photos in situations when it is not appropriate. Moreover, the user and others will recognize that, when the device is in the specific orientation, it will not take pictures.

The method may further comprise selectively operating the device in a ready state, wherein the camera is active and wherein the data processing unit is in a low power mode.

The method may further comprise causing the device to transition from the take photo state to the ready state if the signal from the motion sensor is above the first threshold value and/or if the signal from the camera unit represents a light level higher than the second threshold value.

Optionally, the transition to the sleep state may require a lower second threshold value than a transition to the ready state. For example, it may be desirable to transition to sleep state only when there is substantially no light, while remaining in ready state when there is little light, although not sufficient to provide an acceptable photo.

The device may be caused to transition from the ready state to the take photo state in response to a clock signal.

The clock signal may be a real time clock signal provided by a device clock.

The method may further comprise causing the device to transition from the ready state to the take photo state if the signal from the motion sensor represents a predetermined motion pattern, such as a particular sequence of motions.

The predetermined motion pattern may be composed of one or more absolute values, which may occur within a predetermined time period. For example, two values exceeding a predetermined threshold value and received within a predetermined time interval may be understood as a "double tap", i.e. the user taps the device twice with his/her finger in order to trigger it to take an ad hoc photo.

The method as claimed in any one of the preceding claims, further comprising selectively operating the device in a snooze state, wherein the device checks at least one transition indicator.

Such a transition indicator may be an indicator indicating that a particular event has occurred, such as the device having been shaken or received a clock signal.

The method may further comprise causing the device to transition from the snooze state to the sleep state if the signal from the motion sensor is below a first threshold level or if the signal from the camera unit represents a light level lower than a predetermined second threshold value.

The first threshold level may be set so as to indicate whether the device is stationary on a substantially flat surface or whether it is in motion.

In the method, the device may be caused to transition from the snooze state to the sleep state if the signal from the motion sensor has been below the first threshold value for a sufficient period of time or if the signal from the camera unit represents a light level lower than the first threshold value for a sufficient period of time.

The periods of time may be same or different.

The method may further comprise determining a gravity vector and causing the device to transition to the sleep state only if the gravity vector is within a predetermined range.

Hence, it is possible to determine the orientation of the device, and to condition the transition to the sleep state on the device having a specific orientation, such as horizontal.

The method may further comprise causing the device to transition from the snooze state to the take photo state if the signal from the motion sensor exceeds the first threshold value and/or if the signal from the camera unit represents a light level higher than the second threshold value.

The method may further comprise causing the device to transition from the sleep state to the snooze state if the signal from the motion sensor represents an absolute value larger than a third threshold level.

For example, this third threshold value could be set such that it will indicate that the device is in motion, or it may be slightly higher, such that it will indicate that the device is being shaken, i.e. that the user deliberately shakes it to cause it to "wake up".

The method may further comprise increasing the third threshold level if a signal from the camera unit represents a light level higher than the predetermined second threshold level.

Hence, it is possible to cause the camera to increase its tolerance for movements when it is too dark to take acceptable photos.

The method may further comprise causing the device to transition from the sleep state to the snooze state in response to a clock signal.

The method may further comprise causing the device to transition from the ready state to the take photo state if the signal from the motion sensor represents a predetermined motion pattern, such as a particular sequence of motions.

The method may further comprise causing the device to transition from the sleep state to the take photo state if the signal from the motion sensor represents a predetermined motion pattern, such as a particular sequence of motions, and/or if the signal from the motion sensor exceeds a first threshold value. Hence, the device may be caused to wake up to immediately take a photo upon recording a predetermined motion pattern and/or a sufficiently large/fast motion.

The predetermined motion pattern may be composed of one or more absolute values, which may occur within a predetermined time period. For example, two values exceeding a predetermined threshold value and received within a predetermined time interval may be understood as a "double tap", i.e. the user taps the device twice with his/her finger in order to trigger it to take an ad hoc photo.

The method may further comprise that control parameters for the device is set by using a communication device having a first interface for communicating with the lifelogging device and a second interface for communicating with a network-based storage service.

Thereby, the user may determine settings for the lifelogging device by using a communication device such as a Smartphone, a tablet computer, a desktop computer, a laptop computer etc which is able to control settings of the lifelogging device. For example, the rate at which photos are taken can be adjusted. Hence, a better user experience and a higher user friendliness is achieved.

The method may further comprise sending a captured photo from the device to a storage device or a storage service via at least one wireless communication interface. The wireless interface may, as non-limiting examples, be a Bluetooth® interface or a WiFi interface to which the lifelogging device is connected. Another interface may be a wired interface, such as an electronic or optical fiber based interface, or a wireless interface, such as a cellular phone/data based interface.

The photo taken by the lifelogging device may be a single photo, a sequence of photos or a video sequence.

According to a second aspect, there is provided a wearable lifelogging device comprising a data processing unit, a camera unit, and at least one motion sensor. The device is configured to perform the method described above.

The lifelogging device may have a front face (i.e. the face with camera lens) which is designed such that when placing the device face down on a horizontal surface, the amount of light reaching the camera lens will be sufficiently low for the camera to detect a light level lower than the first threshold value. For example, the camera may have a substantially planar front surface, with the camera lens being flush with, or retracted from, the front surface.

DETAILED DESCRIPTION OF THE PREFERRED EMBODIMENT

Figure 1:
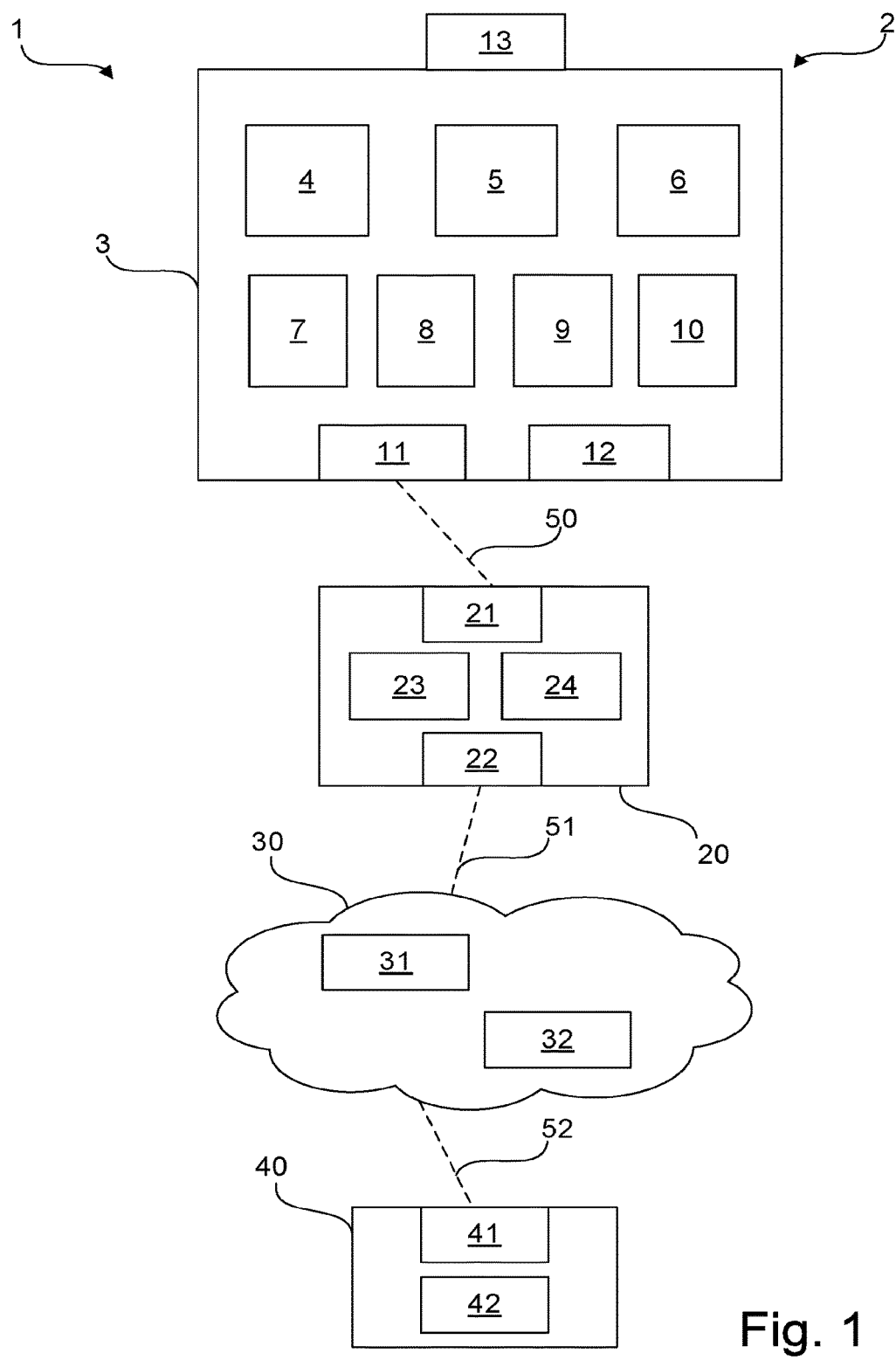
FIG. 1 is a schematic illustration of components of a lifelogging system.

FIG. 1 illustrates schematically components of a lifelogging system 1. The system 1 comprises a wearable lifelogging device 2 which has a weather protected housing 3 which encloses a GPS unit 4, an accelerometer 5, a timer 6 (which may have the form of a real-time clock (RTC)), a camera 7, a storage device 8 which may comprise volatile and non-volatile memory, a CPU 9, a rechargeable battery 10, a communication interface 11 and a user interface 12. A clip 13 is arranged on the outside of the housing. The system 1 also comprises a first communication device 20 which has interfaces 21 and 22 for communicating with the lifelogging device 2 and a network-based storage service 30, respectively. The first communication device 20 can have a controller 23 and a charger 24. The network-based storage service 30 may comprise a storage service 31 and a computing service 32. The network-based storage service 30 may also be connected to a second communication device 40 via the latter's interface 41. The second communication device 40 also comprises application software 42.

Dashed lines represent connections 50, 51 and 52 between the components of the lifelogging system 1.

When a user wears the lifelogging device 2, for example by attaching it to a piece of clothing or a necklace, the camera 7 may be preset to automatically take two photographs a minute. It is also possible to allow the user to trigger the camera to take a photograph by performing a predetermined gesture, such as tapping the camera once, twice or three times within a predetermined time period and possibly in a predetermined direction.

When the lifelogging device takes a photo it may be a single photograph, a sequence of photos or a video sequence. A video sequence normally means a frame rate of more than 20 frames per second, whereas a sequence of photos may have a frame rate between 1 and 20 frames per second. A single photo refers to photos with a frame rate less than 1 frame per second, preferably on the order of one frame every 5-240 seconds, more preferably on the order of one frame every 20-120 seconds.

The CPU 9 may be programmed to stop taking photographs, power off and/or cause the camera 7 to hibernate or go into a low-power mode (e.g. by turning off one or more other sensors), if it receives a predetermined sensor signal from the camera indicating that the photograph is darker than a predetermined level.

The CPU 9 may also be programmed to stop taking photographs, power off and/or cause the camera 7 to hibernate or go into a low-power mode (e.g. by turning off one or more other sensors), if it receives a sensor signal from the accelerometer 5 indicating that the lifelogging device 2 has moved less than a predetermined amount during a predetermined amount of time.

With each photograph, the CPU 9 may associate location data from the GPS unit 4, orientation data from the accelerometer 5 and time (optionally including date) data from the timer 6. The image, location, orientation and time data of the photograph are stored in non-volatile memory on the storage device 8 and transferred via the first communication device 20 to the storage service 31 of the network-based storage service 30 when a connection 50 is established between the lifelogging device 2 and the first communication device 20. The transfer may occur during charging of the battery 10 by the charger 24 and the storage may be encrypted.

The first communication device 20 may be a docking station, a Smartphone, a tablet computer, a desktop computer or a laptop computer.

The connection 50, which connects the lifelogging device 2 to the first communication device 20 via the interfaces 11 and 21, may be a wired connection, such as a micro-USB or USB connection, or a wireless connection, such as a wireless LAN, Bluetooth®, NFC, IR, CDMA, GSM, 3G or 4G connection.

The protocol used for communication between the lifelogging device 2 and the first communication device 20 may be the USB mass storage device protocol or a device-specific protocol. A device-specific protocol may comprise features making communication possible only between a specific lifelogging device 2 and a specific communication device 20, which would make it more difficult for an unauthorized person to retrieve the data stored on the lifelogging device 2.

The connection 51, which connects the first communication device 20 to the network-based storage service 30 via the interface 22, may be a wired connection, such as a wired LAN connection, or a wireless connection, such as wireless LAN, CDMA, GSM, 3G or 4G connection.

The protocol used for communication between the first communication device 20 and the network-based storage service 30 may be TCP/IP, HTTP, HTTPS, SSL and TLS.

The network-based storage service 30 may be a REST service.

The computing service 32 of the network-based storage service 30 may analyze and organize the photographs based on its image, location, orientation and/or time data. The photographs may be organized on a timeline and into groups of photographs fulfilling certain criteria, such as being from the same surroundings. The criteria may be user defined and the colors of the images may be used to determine which photographs were taken in the same surroundings. The photographs may be analyzed and their relevance assessed using criteria based on, for example, motion blur, contrast, composition, light, face recognition and object recognition. A group of photographs fulfilling certain criteria may be analyzed in order to select a photograph which is particularly representative, according to some criteria, of that group of photographs. The selected photograph may be used to give the user a rough idea of what the photographs in the group of photographs are showing and when they were taken.

The user can use a second communication device 40, for example a Smartphone, a tablet computer, a desktop computer or a laptop computer, to access the photographs and to set control parameters for the lifelogging device 2, the network-based storage service 30 and the first communication device 20.

Control parameters may, for example, determine the image capture rate and the time dependence of the image capture rate. For example, a user may set a higher image capture rate during a certain time period of a certain day. Control parameters may also determine whether a photograph stored on storage device 31 can be accessed by other users.

The user may use the second communication device 40 to perform computing functions of the computing service 32. A computing function may be photo editing.

The application software 42, which, for example, can be a web browser or an application for smart phones or tablet computers, may be used to perform the computing functions and to set control parameters.

The connection 52, which connects the second communication device 40 to the network-based storage service 30 via the interface 41, may be a wired connection, such as a wired LAN connection, or a wireless connection, such as a wireless LAN, CDMA, GSM, 3G or 4G connection.

The protocol used for communication between the second communication device 40 and the network-based storage service 30 may be TCP/IP, HTTP, HTTPS, SSL and TLS.

The network-based storage service 30 may send push notifications to the second communication device 40, for example when photographs taken by the lifelogging device 2 have been transferred to the network-based storage service 30.

The network-based storage service 30 may send data to and receive data from devices which are not a part of the lifelogging system 2. For example, data captured by the GPS unit 4 may be sent to a third-party which analyses the data and sends the coordinates represented by the data to the network-based storage service 30. The network-based storage service 30 may send and receive data, for example image data, to other network-based services, for example social-networking services.

Figure 2A:
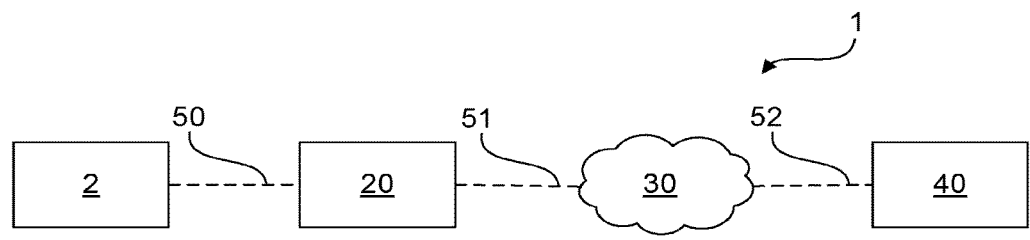
FIGS. 2a-2c are schematic illustrations of different configurations of a lifelogging system.

FIG. 2a illustrates schematically a lifelogging system 1 in which the lifelogging device 2 is configured to send image, location, orientation and time data to a first communication device 20 over a connection 50 which may be a wired connection, such as a micro-USB, USB or wired LAN connection, or a wireless connection, such as a wireless LAN, Bluetooth, NFC, IR, CDMA, GSM, 3G or 4G connection. The protocol used for communicating over the connection 50 may be the USB mass storage device protocol, TCP/IP, HTTP, HTTPS, SSL or TSL or a device-specific protocol.

The first communication device 20 may be a docking station, a Smartphone, a tablet computer, a desktop computer or a laptop computer.

The first communication device 20 is configured to send the image, location, orientation and time data to the network-based storage service 30 over a connection 51 which may be a wired connection, such as a wired LAN connection, or a wireless connection, such as wireless LAN, CDMA, GSM, 3G or 4G connection. The protocol used for communicating over the connection 51 may be TCP/IP, HTTP, HTTPS, SSL or TSL.

A user can access the data stored on the network-based storage service 30 through a second communication device 40 which is also configured to send control parameters to the network-based storage service 30 over a connection 52. The connection 52 may be a wired connection, such as a wired LAN connection, or a wireless connection, such as a wireless LAN, CDMA, GSM, 3G or 4G connection. The protocol used for communicating over the connection 52 may be TCP/IP, HTTP, HTTPS, SSL or TSL.

The control parameters sent by the second communication device 40 may comprise control parameters for the network-based storage service 30, the first communication device 20 and the wearable lifelogging device 2. The network-based storage service 30 transfers, over the connection 51, control parameters to the first communication device 20 which, in turn, transfers the control parameters to the wearable lifelogging device 2 over the connection 50.

Figure 2B:
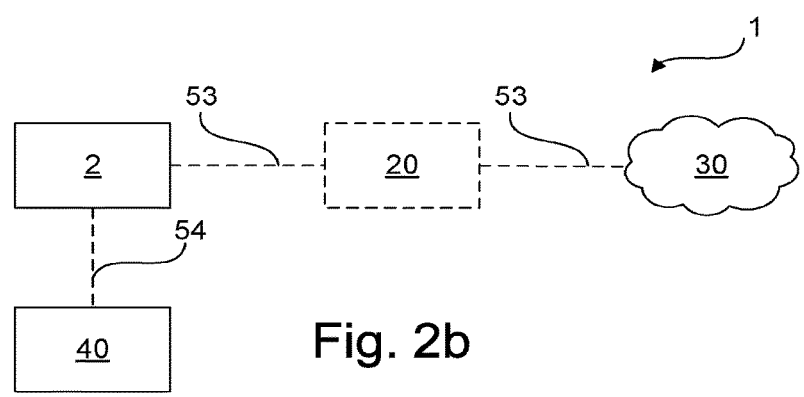

FIG. 2b illustrates schematically a lifelogging system 1 in which a wearable lifelogging device 2 is configured to communicate directly with a second communication device 40 and a network-based storage service 30 over connections 53 and 54, respectively.

The second communication device 40 may be a Smartphone, a tablet computer, a desktop computer or a laptop computer.

The connection 53 may be a wired connection, such as a wired LAN connection, or a wireless connection, such as a wireless LAN, CDMA, GSM, 3G or 4G connection. The protocol used for communicating over the connection 53 may be TCP/IP, HTTP, HTTPS, SSL or TSL.

The connection 54 which may be a wired connection, such as a micro-USB, USB or wired LAN connection, or a wireless connection, such as a wireless LAN, Bluetooth, NFC, IR, CDMA, GSM, 3G or 4G connection. The protocol used for communicating over the connection 54 may be the USB mass storage device protocol, TCP/IP, HTTP, HTTPS, SSL or TSL or a device-specific protocol.

If a first communication device 20 is provided, the lifelogging device 2 may also communicate with the first communication device 20 which may be configured to communicate with the network-based storage service 30.

The first communication device 20 may be a docking station, a Smartphone, a tablet computer, a desktop computer or a laptop computer.

The first communication device 20 may communicate with the be lifelogging device 2 over a wired connection, such as a micro-USB, USB or wired LAN connection, or a wireless connection, such as a wireless LAN, Bluetooth, NFC, IR, CDMA, GSM, 3G or 4G connection. The protocol used for communicating may be the USB mass storage device protocol, TCP/IP, HTTP, HTTPS, SSL or TSL or a device-specific protocol.

The first communication device 20 may communicate with the network-based storage service 30 over a wired connection, such as a wired LAN connection, or a wireless connection, such as a wireless LAN, CDMA, GSM, 3G or 4G connection. The protocol used for communicating may be TCP/IP, HTTP, HTTPS, SSL or TSL.

Figure 2C:
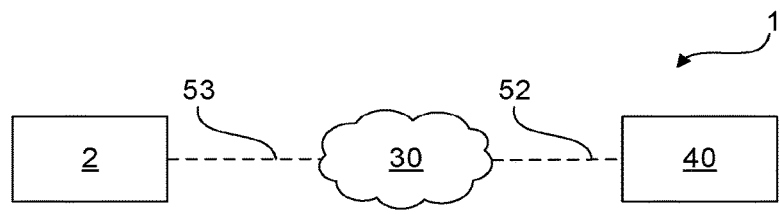

FIG. 2c illustrates schematically a lifelogging system 1 in which a wearable lifelogging device 2 and a network-based storage service 30 are configured to communicate over a connection 53 which may be a wired connection, such as a wired LAN connection, or a wireless connection, such as a wireless LAN, CDMA, GSM, 3G or 4G connection. The protocol used for communicating over the connection 53 may be TCP/IP, HTTP, HTTPS, SSL or TSL.

Communication also occurs between the network-based storage device 30 and a communication device 40 over a connection 52 which may be a wired connection, such as a wired LAN connection, or a wireless connection, such as a wireless LAN, CDMA, GSM, 3G or 4G connection. The protocol used for communicating over the connection 52 may be TCP/IP, HTTP, HTTPS, SSL or TSL.

The communication device 40 may be a Smartphone, a tablet computer, a desktop computer or a laptop computer.

Figure 3:
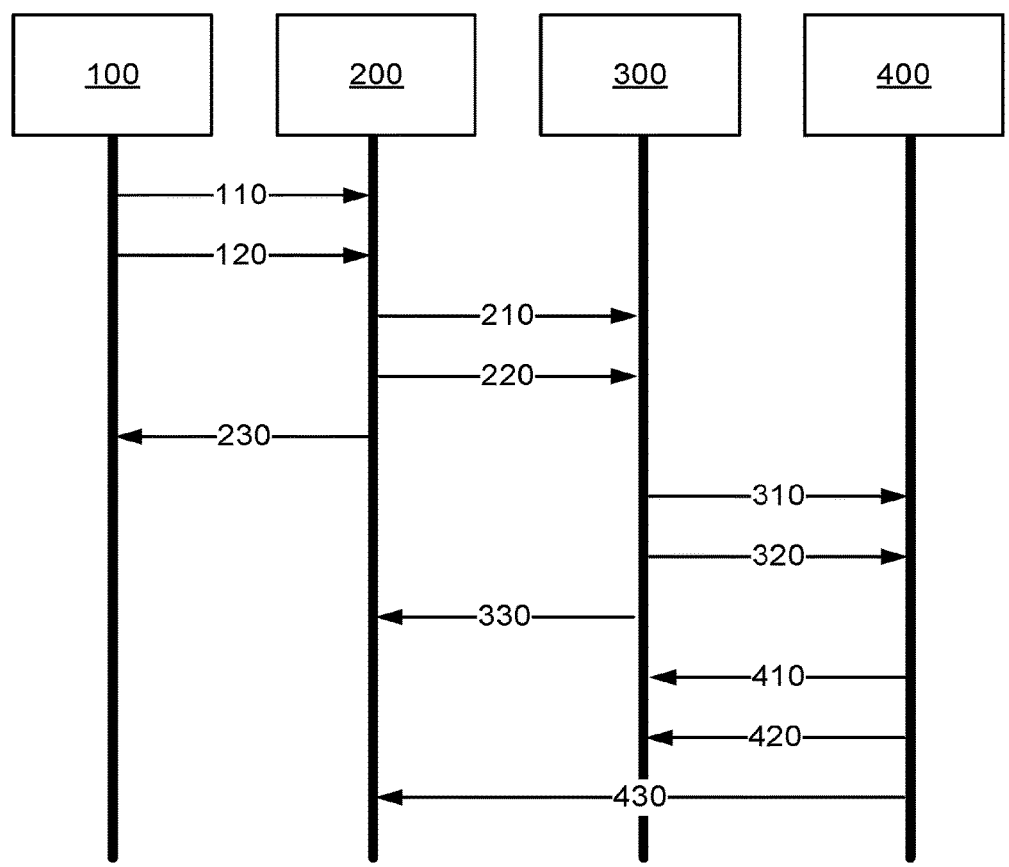
FIG. 3 is a state diagram, which schematically illustrates operation of the lifelogging device 2.

Referring to FIG. 3, a method of operating the wearable lifelogging device will now described.

The method may be implemented in a finite state machine.

The device may be operable in four different states. In a ready state 100, the camera may be active in the sense that it can provide a signal indicating at least an amount of light received at the camera's image sensor, while the remainder of the device is in a low power mode. In the low power mode, one or more parts of the device may not be active, or may be active but operating at a lower clock frequency as compared to normal operation.

The device may further be operable in a take photo state 200, wherein the device wakes up from the low power mode, the camera takes a photo and optionally all sensors (e.g. accelerometer, GPS sensor, etc.) are read.

The device may further be operable in a sleep state 300, wherein the entire device is in a low power mode. In this mode, the real time clock may be active to provide a clock signal, as may those parts of the device necessary to determine whether the clock signal meets a criterion for a transition to take place.

The device may further be operable in a snooze state 400, wherein the device checks whether it should wake up (i.e. transition to the take photo state).

The device may further be said to be operable in two modes: active mode, where the device shifts 110, 120, 230 between the ready state 100 and the take photo state 200 and a sleep mode, where the device shifts 310, 320, 410, 420 between the sleep state 300 and the snooze state 400.

From the ready state 100, the following transitions may take place.

On receipt of a signal from the clock, the device may transition 110 to the take photo state 200. This may be the case where the device is in normal operation, i.e. takes photos at predetermined intervals, such as two photos per minute, etc.

On detection of a specific movement or sequence of movements by the motion sensor or the GPS sensor, the device may transition 120 to the take photo state 200. This may be the case where the device is arrange to detect the user tapping on the device with his/her finger in order to trigger the device to take an ad hoc photo. Hence, in this specific example, the motion sensor would sense two or more accelerations exceeding a particular threshold value within a predetermined time period, such as 1-3 seconds. Optionally the durations of the accelerations may be very short, hence indicating that the device did not move too much, e.g. that it moved less than 10 cm or less than 5 cm as a consequence of the tapping.

From the take photo state 200, the following transitions may take place.

When detecting that the device is placed stationary and optionally with a specific orientation, such as horizontally, the device may transition 210 to the sleep state 300. In this case, the device may detect an acceleration vector which is below a first threshold value T1 (thus indicating that the device is stationary) and optionally also an acceleration vector, which may indicate that the device has been given a specific orientation, such as flat (with front or back side down) on a surface. This condition may be referred to as a "flat surface detection". This transition 210 may be conditioned on the device having the specific orientation during a predetermined time period, such as e.g. 15, 30 or 45 seconds or 1-5 minutes.

Similarly, when the camera receives light below a predetermined second threshold value T2, the device may transition 220 to the sleep state 300. This transition may be referred to as a "low light detection". This transition 220 may also be conditioned on the device receiving the low level of light during a predetermined time period, such as e.g. 15, 30 or 45 seconds or 1-5 minutes.

If, when in the take photo state 200, neither flat surface nor low light is detected, the device may transition 230 to the ready state 100.

From the sleep state 300, the following transitions may take place.

When detecting an absolute value larger than a third threshold value T3, the device may transition 310 to the snooze state 400. The third threshold value T3 may be a value indicating that the user is deliberately shaking the device in order for it to wake up. Hence, an absolute value of an accelerometer signal may be used. The third threshold value T3 may typically be higher than the first threshold value T1, since that value merely distinguishes movement from stationary. In addition it is possible to set a flag F1 to indicate that a "wake up on shake" event has occurred.

The device may also transition 320 from the sleep state 300 to the snooze state based on a clock signal. This may be the case where the device is in normal operation, i.e. takes photos at predetermined intervals, such as two photos per minute, etc.

The device may also transition 330 from the sleep state 300 on detection of a specific movement or sequence of movements by the motion sensor or the GPS sensor, this procedure may be substantially the same as the transition 120 to the take photo state 200 described above. Hence, an interrupt could be provided by the motion sensor, which may immediately cause the device to transition 330 from the sleep state 300 to the take photo state 200, without going through the snooze state 400.

From the snooze state 400, the following transitions may take place.

When detecting that the device is placed stationary and optionally with a specific orientation, as described above with respect to the transition 210, the device may transition 410 to the sleep state 300.

Similarly, when detecting a low light condition, the device may transition 420 to the sleep state 300, as described above with respect to the transition 220 to the sleep state.

If the "wake up on shake" flag F1 is set, thus implying that the device has been shaken, and the light level is too low, the device may increase the third threshold value T3, thus making the device less sensitive to shaking, and then clear the "wake up on shake" flag F1.

If neither flat surface nor low light is detected, the device may transition 430 to the take photo state 200. In this case, the third threshold value T3 may be reset, i.e. to normal sensitivity to shaking, and the "wake up on shake" flag F1 may be cleared.

It would be possible to provide a separate light sensor in or near the camera opening, which would enable detection of sufficient light level without making use of the camera. This could be an option for further reducing the battery consumption.

What is claimed is:

1. A camera configured to automatically capture images, the camera comprising:
   a housing comprising:
      a battery;
      an image sensor;
      a memory; and
      one or more hardware processors connected with the image sensor and the memory; and
   a clip configured to be attached outside of the housing, wherein the clip is further configured to secure the housing to an object;
   wherein the one or more hardware processors are further configured to:
      receive a first test image data from the image sensor at a first time;
      apply rules corresponding to picture quality on the received first test image data;
      automatically determine whether to capture additional image data for a time period from the first time and store the additional image data in the memory based on the application of rules indicating that the first test image data meets criteria for storing additional image data in the memory;

receive a second test image data from the image sensor at a second time;

apply the rules corresponding to picture quality on the received second test image data; and automatically turn off one or more components included in the housing based on the application of rules on the received second test image data indicating that conditions are not appropriate for capturing photos.

2. The camera of claim 1, wherein the one or more hardware processors are further configured to capture a video sequence.

3. The camera of claim 1, wherein the application of rules comprises detecting a light level in the received image data.

4. The camera of claim 1, wherein the application of rules comprises detecting blur in the received image data.

5. The camera of claim 1, wherein the application of rules comprises detecting a face in the received image data.

6. The camera of claim 1, wherein the application of rules comprises detecting an object in the received image data.

7. The camera of claim 1, wherein the application of rules comprises detecting an orientation of a face or an object in the received image data.

8. The camera of claim 1, wherein the one or more hardware processors are configured to receive an input corresponding to a user tap and capture new image data based on the received input.

9. The camera of claim 1, wherein the one or more hardware processors are further configured to automatically select a photograph based on selection rules, wherein the selected photograph is representative of the additional image data.

10. A method of automatically capturing images in a camera, wherein the camera comprises a battery, an image sensor, a memory, and one or more hardware processors, the method comprising:

receiving image data from an image sensor at a first time;

applying rules corresponding to picture quality on the received image data; and automatically determining whether to store the received image data in the memory based on the application of rules, wherein the application of rules comprise detecting a light level directly from first test image data captured from the image sensor; and automatically turning off one or more components included in the housing based on the application of rules on the received image data indicating that conditions are not appropriate for capturing photos.

11. The method of claim 10, further comprising determining capture of additional image data from the image sensor for a period of time from the first time based on the application of the rules on the received image data, thereby capturing a video sequence.

12. The method of claim 10, further comprising stopping capture of additional image data from the image sensor based on the application of rules, thereby conserving the battery.

13. The method of claim 10, wherein the application of rules comprises detecting blur in the received image data.

14. The method of claim 10, wherein the application of rules comprises detecting a face in the received image data.

15. The method of claim 10, wherein the application of rules comprises detecting an orientation of a face or an object in the received image data.

16. A camera configured to automatically capture images, the camera comprising:

a housing comprising:
  a battery;
  an image sensor configured to detect image data;
  a memory; and
  one or more hardware processors connected with the image sensor and the memory;

wherein the one or more hardware processors are further configured to determine whether to store the detected image data in the memory based on an application of rules corresponding to picture quality on the detected image data and determine whether to automatically turn off one or more components included in the housing based on the application of rules on the received image data indicating that conditions are not appropriate for capturing photos.

17. The camera of claim 16, wherein the one or more hardware processors are further configured to automatically stop detecting image data from the image sensor based on the application of rules, thereby conserving the battery.

18. The camera of claim 16, wherein the one or more hardware processors are further configured to automatically determine storage of additional image data from the image sensor for a period of time based on the application of the rules on the received image data, thereby capturing a video sequence.

19. The camera of claim 16, wherein the application of rules comprises detecting a light level in the received image data.

20. The camera of claim 16, wherein the application of rules comprises detecting a face in the received image data.

* * * * *